United States Patent
Shemer et al.

(10) Patent No.: US 10,958,536 B2
(45) Date of Patent: Mar. 23, 2021

(54) DATA MANAGEMENT POLICIES FOR INTERNET OF THINGS COMPONENTS

(71) Applicant: EMC IP Holding Company LLC, Hopkinton, MA (US)

(72) Inventors: Jehuda Shemer, Kfar Saba (IL); Assaf Natanzon, Tel Aviv (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/959,592

(22) Filed: Apr. 23, 2018

(65) Prior Publication Data

US 2019/0327152 A1    Oct. 24, 2019

(51) Int. Cl.
*H04L 12/24*    (2006.01)

(52) U.S. Cl.
CPC .................................... *H04L 41/32* (2013.01)

(58) Field of Classification Search
CPC ........................................................ H04L 41/32
See application file for complete search history.

(56) References Cited

U.S. PATENT DOCUMENTS

| | | | |
|---|---|---|---|
| 2014/0344269 A1* | 11/2014 | Dong | H04L 67/12 707/736 |
| 2016/0275706 A1* | 9/2016 | Nolan | G06T 11/206 |
| 2017/0060574 A1* | 3/2017 | Malladi | G06F 9/542 |
| 2019/0058711 A1* | 2/2019 | Zhu | H04W 4/70 |
| 2019/0149599 A1* | 5/2019 | Bartfai-Walcott | H04L 29/08 |

OTHER PUBLICATIONS

"AWS IoT Services Overview—Amazon Web Services", downloaded from https://aws.amazon.com/iot/?sc_channel=PS&sc_campaign=acquisition_US&sc_publisher=google&sc_medium=iot_b&sc_content=iot_e&sc_detail=aws%20iot&sc on Apr. 16, 2018.

"IoT Hub—Connect, monitor, and manage billions of IoT assets", downloaded from https://azure.microsoft.com/en-us/services/iot-hub?&WT.srch=1&WT.mc_id=AID631184_sem_EZBdBXY8&iNkD=gOOGLE_aZURE_bRAND&GCLID=cJWkcaJWK9HWBR on Apr. 16, 2018.

"Build What's Next Better software. Faster", https://cloud.google.com/?utm_source=google&utm_medium=cpc&utm_campaign=na-US-all-dr-skws-all-all-trial-b-dr-1003905&utm_content=text-ad-none-any on Apr. 16, 2018.

"Innovating smart home solutions deepens customer engagement and grows revenue", downloaded from https://www.asper.com/ on Apr. 16, 2018.

(Continued)

*Primary Examiner* — Suraj M Joshi

(74) *Attorney, Agent, or Firm* — Ryan, Mason & Lewis, LLP

(57) ABSTRACT

Techniques are provided for implementing data management policies for various components of an Internet of Things (IoT) system. An exemplary method performed by an IoT component comprises: obtaining sensor data; obtaining a data management policy that specifies a data transmission policy, a data retention policy, a data retirement policy and/or a data processing policy for a processing of the sensor data by a plurality of IoT components; and processing the sensor data based on the obtained data management policy. Data policy operators are optionally provided to (i) adjust a resolution of the sensor data; (ii) aggregate the sensor data; and/or (iii) apply a learning algorithm to the sensor data, based on the data management policy.

20 Claims, 7 Drawing Sheets

(56) References Cited

OTHER PUBLICATIONS

"The Connectivity Platform for the Internet of Things", downloaded from https://hologram.io/ on Apr. 16, 2018.
"Sigfox, the world's leading IoT services provider", downloaded from https://www.sigfox.com/en on Apr. 16, 2018.
"IBM Internet of Things Foundation", downloaded from https://www.ibm.com/developerworks/community/files/basic/anonymous/api/library/4710185f-7f2a-47d6-99ec-a1003295607a/document/2b7ebf2e-918c-4b56-aa77-c714750ac176/media/IBM%20IoTFoundationWorkshop.pdf on Apr. 16, 2018.

* cited by examiner

DATA MANAGEMENT POLICY 200
- DATA TRANSMISSION POLICY 210
- DATA RETENTION POLICY 220
- DATA RETIREMENT POLICY 230
- DATA PROCESSING POLICY 240
- DATA POLICY OPERATORS 250

FIG. 2

```
DATA MANAGEMENT POLICY 500
{
    SAMPLERATE = 100HZ

RETENTION
    //DEFINE ONE MONTH RETENTION, DOWN-SAMPLE FOR RETIREMENT
    3 DAYS FULL RESOLUTION
    HOURLY RESOLUTION FOR 27 DAYS

ONCOMMUNICATIONLOSS
    STORE DATA
    REDUCE RESOLUTION BY X120 WHEN STORAGE RUNS OUT

TARGET: GW SOUTH 420-S
    PRIORITY: 2
    BWLIMIT: 20MBS
    REDUCE RESOLUTION UP TO X60 TO MEET BW LIMIT

TARGET: SUB-TREE OF GW SOUTH 420-S
    SAMPLERATE: 10HZ

TARGET: SENSORS 410-3
    ONCOMMUNICATIONLOSS: DELETE DATA

TARGET: SENSORS 410-1
    LOW-PASS FILTER @60HZ
}
```

FIG. 5

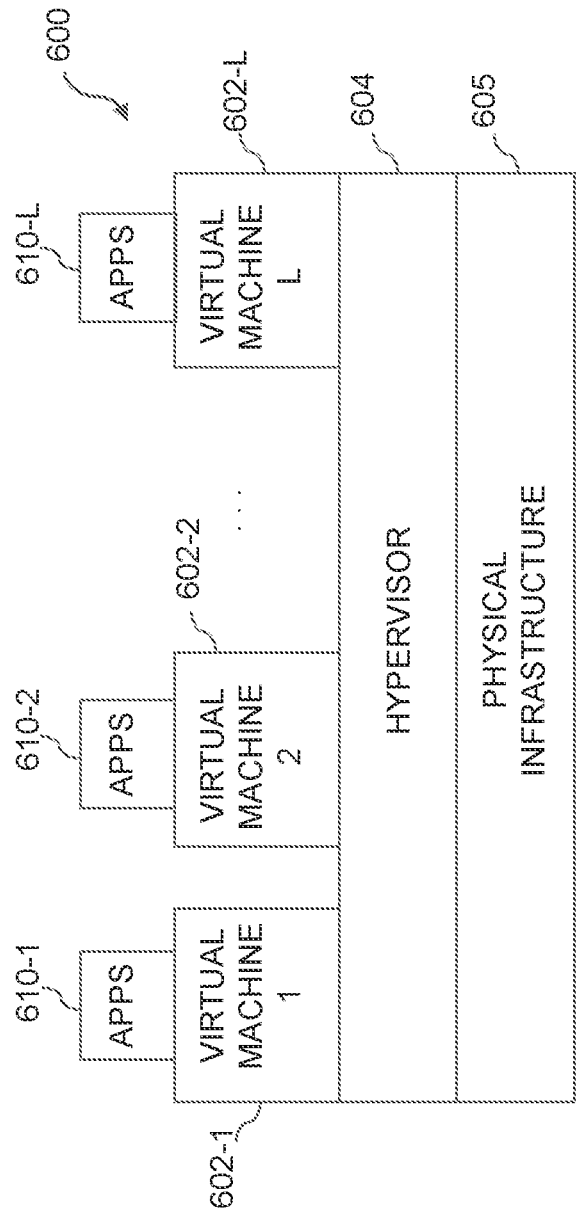

DATA MANAGEMENT POLICIES FOR INTERNET OF THINGS COMPONENTS

FIELD

The field relates generally to the processing of sensor data.

BACKGROUND

The Internet of Things (IoT) is a network of distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

A number of IoT management frameworks exist for managing devices that generate and process sensor data. As society grows increasingly dependent on such sensor data, however, the proper management of the gathered sensor data itself also becomes critical. A need therefore exists for techniques for implementing policies for managing the sensor data.

SUMMARY

Illustrative embodiments of the present disclosure provide techniques for implementing data management policies for various components of an IoT system. In one embodiment, an exemplary method performed by a first IoT component comprises: obtaining sensor data; obtaining, by the first IoT component, a data management policy that specifies one or more of a data transmission policy, a data retention policy, a data retirement policy and a data processing policy for a processing of the sensor data by a plurality of IoT components comprising the first IoT component and one or more additional IoT components; and processing, by the first IoT component, the sensor data based on the obtained data management policy, wherein the plurality of IoT components comprises at least two of (i) at least one edge device that aggregates at least a portion of the sensor data, (ii) at least one processing device, and (iii) at least one backend storage device.

In some embodiments, the data transmission policy specifies how to manipulate the sensor data before the sensor data is transmitted and/or stored by a given IoT component; the data retention policy specifies a duration that the sensor data is maintained in storage; the data retirement policy specifies a processing of the sensor data when a predefined storage criteria is satisfied; and/or the data management policy further specifies a predefined handling of the sensor data when communications are disrupted.

In one or more embodiments, data policy operators are provided to apply to the sensor data to implement a given data management policy. The data policy operators are optionally employed by one or more IoT components to (i) adjust a resolution of the sensor data; (ii) aggregate the sensor data; and/or (iii) apply a learning algorithm to the sensor data, based on the data management policy.

Other illustrative embodiments include, without limitation, apparatus, systems, methods and computer program products comprising processor-readable storage media.

BRIEF DESCRIPTION OF THE DRAWINGS

FIG. 2 illustrates an exemplary data management policy, according to some embodiments;

FIG. 5 illustrates exemplary pseudo code for a data management policy for the exemplary IoT system of FIG. 4, according to one embodiment of the disclosure;

FIG. 6 illustrates an exemplary processing platform that may be used to implement at least a portion of one or more embodiments of the disclosure comprising a cloud infrastructure.

DETAILED DESCRIPTION

Figure 1:
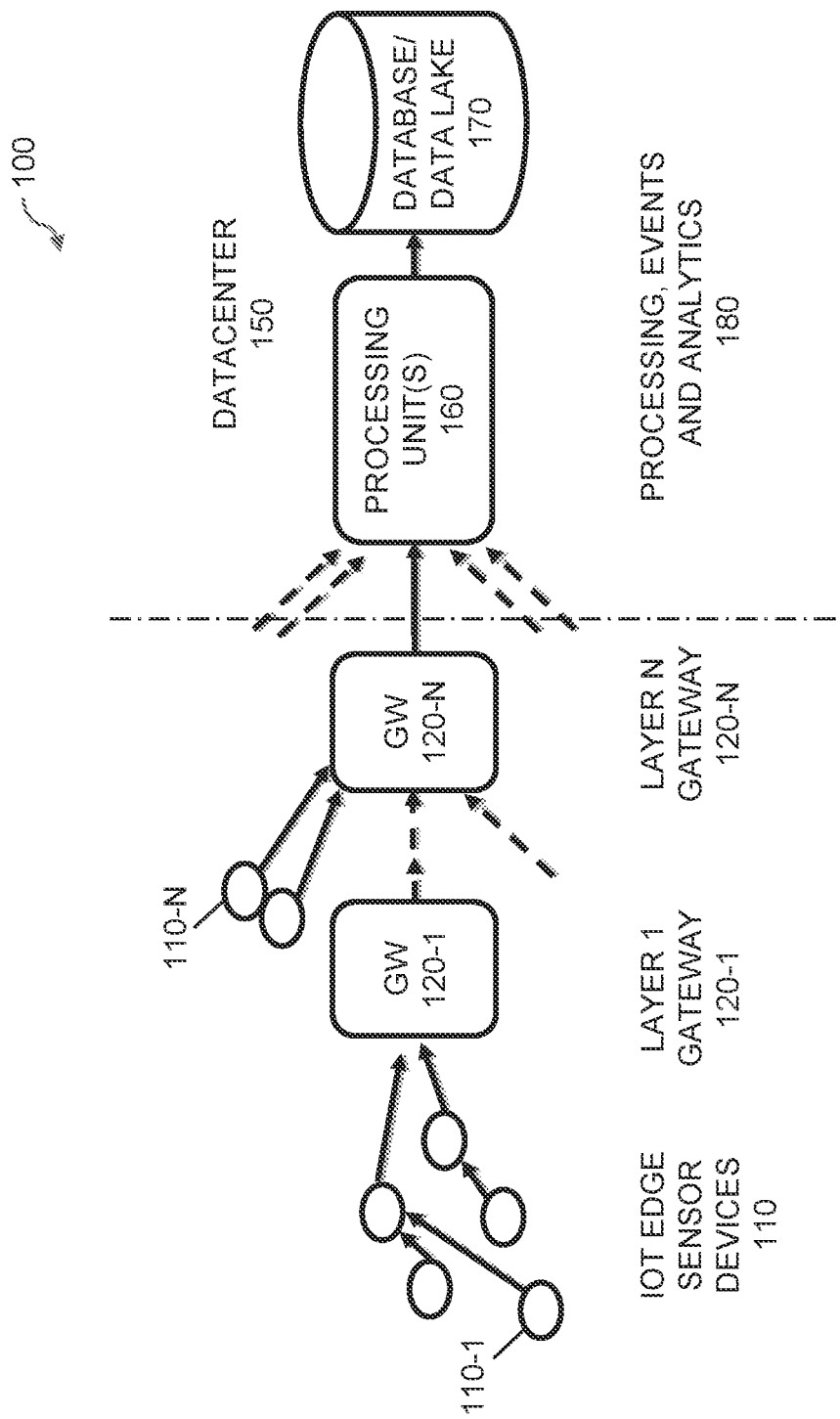
FIG. 1 illustrates an exemplary IoT system, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for implementing data management policies for various components of an IoT system.

In one or more embodiments, holistic data management policy techniques are provided for treating sensor data in an IoT system. The disclosed data management policies connect IoT components, their sensor data and corresponding metadata in a way that allows advanced data management operations to be employed across the IoT system. In some embodiments, the same data management policy, or portions thereof, can be employed for backend storage devices, and on any of the IoT components in the IoT system. The disclosed data management policies allow data to be treated as manageable objects, with the selective application of the appropriate data management policies to the sensor data by various IoT components of an IoT system.

IoT environments are typically complex and a large ecosystem of management software is available to handle this complexity. Existing IoT management frameworks range from software packages to complete platforms and involve many aspects of the IoT system lifecycle including development, deployment and upgrades. A number of commercial products provide complete backend services, as well as support for processing on agents and edge devices and for managing edge devices and other components.

One or more aspects of the present disclosure recognize that complex IoT systems have complex data management needs, and the failure to address these needs may result in degraded systems or a loss of service. A naïve view that these systems have an infinite amount of backend storage and infinite bandwidth to transmit the data, is now encountering barriers of capacity and cost. For on-premise data centers, for example, the capacity is limited and decisions need to be made as to how to treat the sensor data when a capacity is reached. When systems scale, the amount of data to be transmitted from gateways to the backend storage is simply too much. Apart from the bandwidth and cost-related aspects, there are implications on the backend processing scale and cost as well.

The use of cloud storage resources and the reliance on cloud availability may result in IoT data that is not protected at any level. Edge devices and gateways typically push their data to the backend storage devices, where the sensor data is stored. It is often assumed that data protection will be done by the backend storage. In reality, however, cloud providers give little, if any, data protection (especially not enterprise-level service level agreements (SLAs)).

In addition, the diversity of the edge devices is not generalized and each device type typically has its own configuration. While this may be needed for functional configuration, data manipulation can be handled with respect to the edge device itself, and also relative to other devices that have overlapping geography, type and/or gateway, for example. If a gateway reaches a bandwidth limit, all devices connected to the gateway may need to be adjusted.

As used herein, the terms "data ingress" and "egress rate" refer to the aggregate throughput of sensor data at a specific point in the system. For gateways, for example, the ingress rate is the total of all edge device data or other gateway data sent to a given gateway, and the egress is the throughput sent on to the backend storage or a next gateway. Naively, the total ingress equals the egress, but that is not always true. If processing or data policy operators are applied to the sensor data at the gateway, for example, the total ingress and egress values can differ significantly.

In one or more embodiments, the disclosed system-wide data management policy techniques optionally apply to all system components, or subsets thereof; propagate through the entire IoT system; can be queried or consulted both from within the IoT system and from outside the IoT system; can be applied to new components added to the IoT system, and are resilient to components leaving the IoT system; and/or accommodate IoT systems of any scale and scale changes. In this manner, the disclosed data management policy techniques enable any management platform to control the sensor data and management of the sensor data in an IoT system. In addition, the disclosed data management policy techniques will allow management of system resources by changing the data management policies and examining the resulting interactions in the system. As a result, system changes can optionally be made holistically and in an informed way, where the user gains an understanding of how data policy changes affect system operation and resource allocation.

FIG. 1 illustrates an exemplary IoT system 100, according to one embodiment of the disclosure. Generally, IoT systems, such as the exemplary IoT system 100, typically consolidate edge devices to gateways and then to a central backend datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. While gateways 120 are employed in the exemplary embodiment of FIG. 1, the gateways 120 are not mandatory. Gateways 120 are prevalent in numerous implementations, as networking capabilities of edge devices 110 are usually local in nature (e.g., power or connectivity) and the gateway 120 is used to connect to the Internet (not shown in FIG. 1).

The sensors 110 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

FIG. 2 illustrates an exemplary data management policy 200, according to some embodiments. Generally, the exemplary data management policy 200 defines how various IoT components of the exemplary IoT system 100 of FIG. 1 should process the sensor data. For example, in some embodiments, the exemplary data management policy 200 specifies how the sensor data should be stored at different levels of the IoT system 100; how to protect the sensor data against logical corruption or physical disaster at different levels of the IoT system 100; how to treat the sensor data when storage capacity runs out at different levels of the IoT system 100; and/or how to treat the sensor data when bandwidth is limited or communications are disrupted.

As shown in FIG. 2, the exemplary data management policy 200 comprises a data transmission policy 210, a data retention policy 220, a data retirement policy 230, a data processing policy 240 and/or one or more data policy operators 250. The data transmission policy 210, for example, optionally specifies how to manipulate the sensor data before the sensor data is transmitted or stored by a given Internet of Things component (e.g., data policy operators 250 to apply to the sensor data before sending or storing the sensor data and/or a communication disruption behavior, discussed below). The exemplary data retention policy 220 specifies a duration that the sensor data is maintained in storage (a longer retention time means storing more data). The data retirement policy 230 specifies a processing of the sensor data when a predefined storage criteria is satisfied (e.g., when storage capacity is reached). For example, the data retirement policy 230 may specify that older data is deleted, newer data is blocked, older data has a data policy operator 250 employed on it (can be multiple operators 250 and multiple levels at which it is applied), and a tiering and consolidation of the sensor data. The exemplary data processing policy 240 optionally specifies a central processing unit limitation for processing the sensor data (e.g., optionally one or more data policy operators 250 to apply to the sensor data before processing the sensor data, if algorithms are non-linear).

In one or more embodiments, one or more parameters of the data management policy 200 can have an explicit or relative target (e.g., down sample the sensor data to half of the original resolution, or filter data to 3 KB per second).

In some embodiments, the data policy operators 250 are employed by one or more of the IoT components in the exemplary IoT system 100 to, for example, (i) adjust a resolution of the sensor data; (ii) aggregate the sensor data; and/or (iii) apply a learning algorithm to the sensor data, based on the data management policy 200. IoT devices 110 that produce signals do so at a certain frequency and accuracy, referred to herein as the data resolution. Data produced by the edge devices, for example, is referred to as data at full resolution. Generally, higher frequency and better accuracy means more bandwidth and CPU (central processing unit) consumption.

For example, the data policy operators 250 that adjust a resolution of the sensor data may comprise, for example, a down-sampling operator, a low pass filter operator, a bit adjustment per sample operator, an approximation/adaptation operator (e.g., PCM (pulse-code modulation) and/or ADPCM (adaptive differential pulse-code modulation)), an image filter operator (e.g., JPEG (Joint Photographic Experts Group), JPEG2K, or MPEG (Moving Picture Experts Group)), a resolution reduction operator, a video stream frame rate reduction operator, a color sample resolution operator, a transformation operator (e.g., Code Excited Linear Prediction compression for voice data), a classification operator (e.g., the sensor data may comprise an x-ray and the output of the operator may be a classification, such as "suspected cancer" based on the input) and/or a data striping operator.

Likewise, the data policy operators 250 that apply a learning algorithm to the sensor data may comprise, for example, analyzing the sensor data and generating a conclusion (e.g., the input may be a video and the output may indicate that someone has attempted to illegally access some location).

One or more of the data policy operators 250 may have a parameter that defines the extent to which the reduction or other processing is made (e.g., how much to down sample, or a specified JPEG quality). The end result of the data policy operator 250 is typically less data with some metadata that describes what was employed by the data policy operator 250. At the receiving side, the transformation may be compensated for, or reversed (e.g., depending on the context). It is noted that, in some embodiments, the data policy operators 250 do not need domain specific knowledge (though it helps if they do) and can be employed transparently on different edge devices and stream types.

The data management policy 200 optionally also specifies a predefined handling of the sensor data when communications are disrupted. As with any portion of a given data management policy 200, the data management policy may specific different behaviors for different components of the IoT system 100. For example, when communications are disrupted, the data management policy may specify storing samples until communications resume; discarding samples if there is no communication; sending data to other destinations/locations; archiving the sensor data until communications resume; and employing one or more data policy operators 250 before storing/archiving the data.

The interactions in the exemplary IoT system 100 show how a change in one parameter of the data management policy 200 may affect other parts of the IoT system 100. For example, increasing the sampling rate (resolution) results in more storage and more CPUs required to process the data. As used herein, A has an increasing interaction with B if incrementing A results in incrementing B, noted as A↑B; and A has a decreasing interaction with B if incrementing A results in a reduction in B, noted as A↓B.

The following exemplary interactions are observed in the IoT system 100:
  1. Ingress rate (bandwidth)↑CPU;
  2. Ingress rate (bandwidth)↑Storage capacity;
  3. Ingress rate↑egress rate;
  4. Data resolution↑egress rate;
  5. Data resolution↑Storage capacity;
  6. Data retention↑Storage capacity; and
  7. Data retirement↓Storage capacity.

The above interactions are general and do not always hold true. Generally, the interactions around CPU and data rates, for example, can be complex, non-linear and possibly inconsistent.

Looking at interaction 7, for example, the interaction is complex (retiring/deleting data ultimately means a reduction in storage capacity). However, depending on a given system implementation, the reduction may not be immediate or as significant as thought due to delays in garbage collection or allocation strategy anomalies. In the following discussion, for simplicity, linearity is assumed so that interactions 1-6 are increasing in a linear manner, and interaction 7 decreases in a linear manner.

The data transmission policy 210, data retention policy 220, data retirement policy 230, and data processing policy 240, for example, apply to the data lake 170 (backend storage), but also to the gateways 120 and edge devices 110. In some embodiments, the data management policy 200 can designate that a particular policy or portion thereof applies to one or more specific components. The specific components can be specified, for example, based on a device type (e.g., Sensirion Digital Humidity Sensors SHTW2 (RH/T)), a device class (e.g., all temperature sensors), a geographical region, a hierarchical location in an Internet of Things system (e.g., backend devices, or sensor devices under a specific gateway), and/or device identifiers of one or more specific devices.

Figure 3:
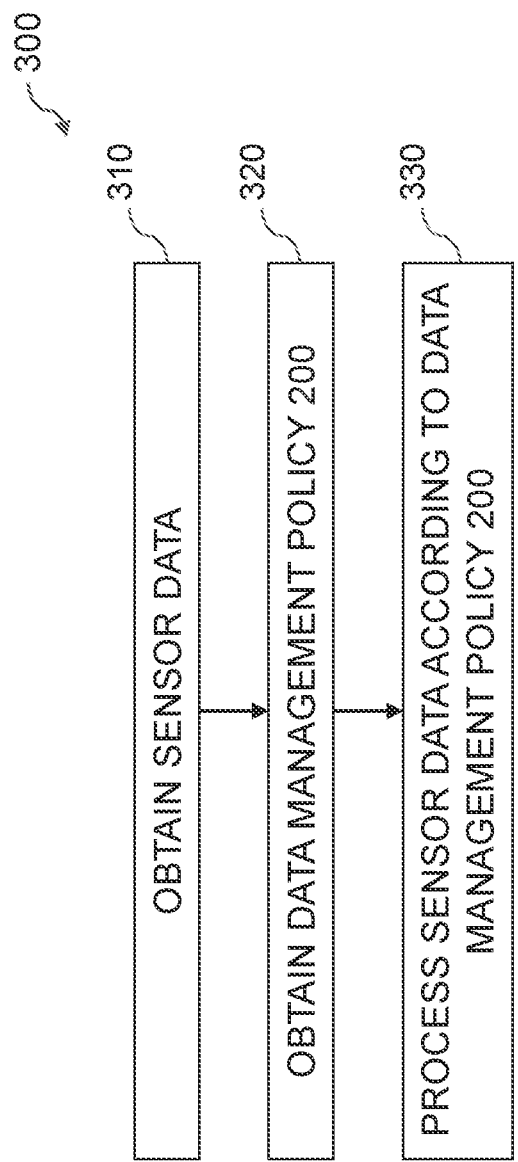
FIG. 3 is a flow chart illustrating a data management policy implementation process, according to an embodiment of the disclosure.

FIG. 3 is a flow chart illustrating a data management policy implementation process 300, according to an embodiment of the disclosure. The exemplary data management policy implementation process 300 is implemented by a given IoT component in the IoT system 100 of FIG. 1. As shown in FIG. 3, during step 310, the exemplary data management policy implementation process 300 initially obtains sensor data. During step 320, the Internet of Things component obtains the data management policy 200 that specifies a data transmission policy 210, a data retention policy 220, a data retirement policy 230 and/or a data processing policy 240 for processing of the sensor data by the Internet of Things components. Finally, during step 330, the exemplary data management policy implementation process 300 processes the sensor data, in the particular Internet of Things component, based on the data management policy 200.

Figure 4:
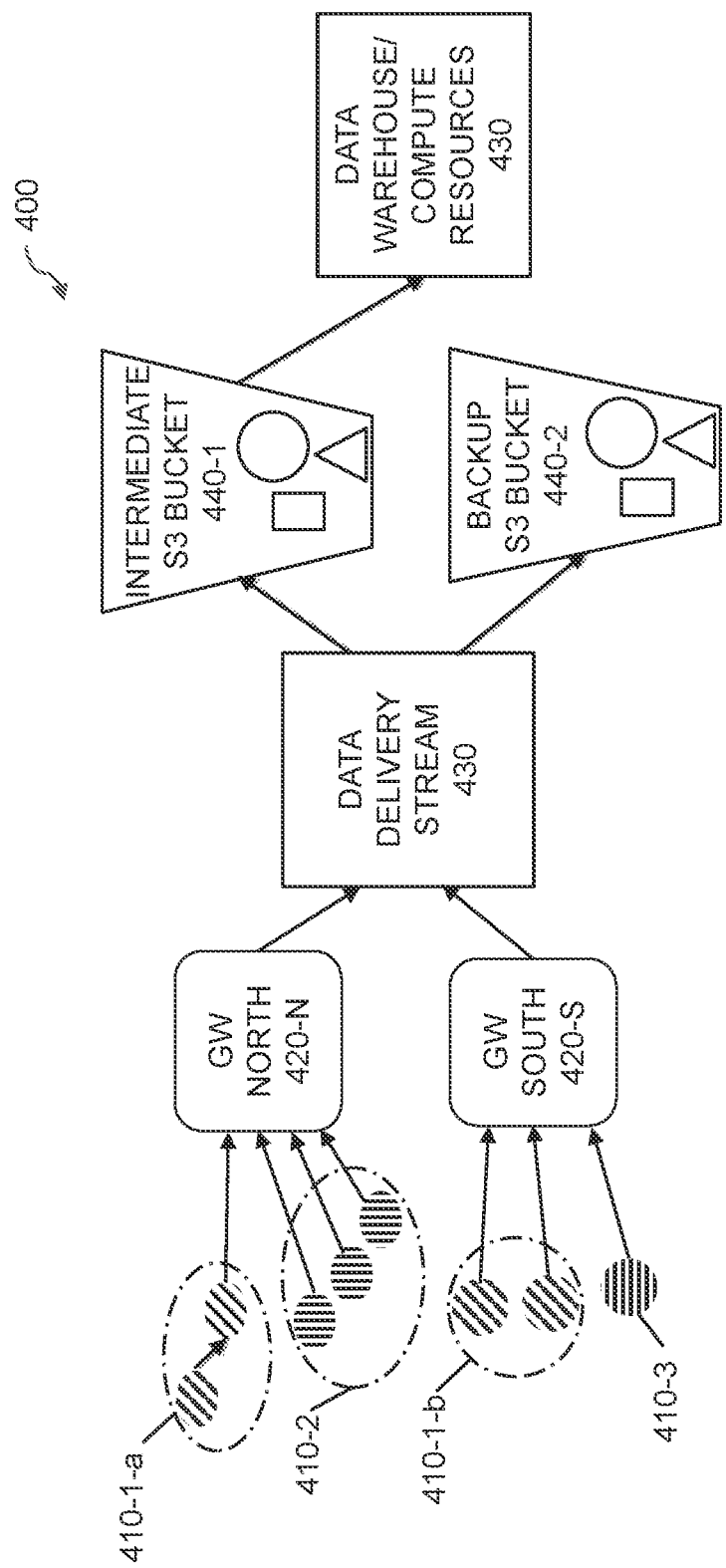
FIG. 4 illustrates an exemplary implementation of the IoT system of FIG. 1, according to some embodiments of the disclosure.

FIG. 4 illustrates an exemplary implementation 400 of the IoT system 100 of FIG. 1, according to some embodiments of the disclosure. As shown in FIG. 4, the exemplary IoT system 40 comprises a plurality of IoT edge sensor device sets 410-1 through 410-3. Each IoT edge sensor device set 410 is comprised of one or more sensor devices of a particular sensor type and is distinguished by a different hash pattern, for ease of illustration. In the example of FIG. 4, IoT edge sensor device set 410-1 has four sensors with the same hash pattern in two sets 410-1-a and 410-1-b, each comprising two sensors.

As noted above, the sensors in the sensor sets 410 provide corresponding sensor readings to a gateway north 420-N or a gateway south 420-S, corresponding to two remote locations, "North" and "South," where South is a secondary site. The IoT edge sensor devices in the sets 410 comprise, for example, sensors, actuators and other devices that produce information or get commands to control the environment they are in. The gateways 420 comprise devices that consolidate communication and management of multiple IoT edge sensor devices. While two gateways 420 are employed in the exemplary embodiment of FIG. 4, the gateways 420 are not mandatory. Gateways 420 are prevalent in numerous implementations, as networking capabilities of edge devices are usually local in nature (e.g., power or connectivity) and each gateway 420 is used to connect to the Internet (not shown in FIG. 4).

The sensors in the sets 410 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art.

The exemplary IoT system 400 of FIG. 4 further comprises a data delivery stream 430, such as a Kinesis firehouse delivery stream from Amazon Web Services (AWS). Generally, the Kinesis data firehose is a service for delivering real-time streaming data to storage destinations. In the embodiment of FIG. 4, the data delivery stream 430 provides the sensor data to an intermediate Simple Storage Service (S3) bucket 440-1 and a backup S3 bucket 440-2, both from Amazon Web Services. Thereafter, the sensor data is processed by a data warehouse/compute resources module 430, such as an Amazon Redshift cluster. Generally, an Amazon Redshift data warehouse is a collection of computing resources referred to as nodes, that are organized into groups called clusters. Each cluster typically runs an Amazon Redshift engine and contains one or more databases.

FIG. 5 illustrates exemplary pseudo code for a data management policy 500 for the exemplary IoT system 400 of FIG. 4, according to one embodiment of the disclosure. The exemplary data management policy 500 is built system wide, across the IoT system 400 of FIG. 4, and defines a default sample rate of 100 Hz for all devices. In addition, there are default instructions for the backend storage devices and all devices that have storage, specifying the retention time and resolution of data at different intervals (e.g., hourly resolution for 27 days). The exemplary data management policy 500 also specifies policies that target certain parts of the IoT system 400 (such as for the gateway south 420-S as a secondary site and sensor type specific information for sensor sets 410-3 and 410-1).

The retention specified by the exemplary data management policy 500 affects the retention in the S3 buckets 440, as well as the data warehouse/compute resources module 430 (e.g., Redshift cluster) and devices. Generally, there is no point in devices sending data at a higher resolution than what can be stored, nor retaining data for a longer period. New sensors introduced into the system 400 can be immediately aligned to the system operational parameters.

One or more embodiments of the disclosure provide improved methods, apparatus and computer program products for implementing data management policies for various components of an IoT system. The foregoing applications and associated embodiments should be considered as illustrative only, and numerous other embodiments can be configured using the techniques disclosed herein, in a wide variety of different applications.

It should also be understood that the disclosed techniques for implementing data management policy techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing data management policies for various components of an IoT system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a data management policy engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a data management policy platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Referring now to FIG. 6, one possible processing platform that may be used to implement at least a portion of one or more embodiments of the disclosure comprises cloud infrastructure 600. The cloud infrastructure 600 in this exemplary processing platform comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

The cloud infrastructure 600 may encompass the entire given system or only portions of that given system, such as one or more of client, servers, controllers, or computing devices in the system.

Although only a single hypervisor 604 is shown in the embodiment of FIG. 6, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 604 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the data management policy engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed data management policy apparatus may each run on a computer, server, storage device or other processing platform element. A given such element may be viewed as an example of what is more generally referred to herein as a "processing device." The cloud infrastructure 600 shown in FIG. 6 may represent at least a portion of one processing platform.

Figure 7:
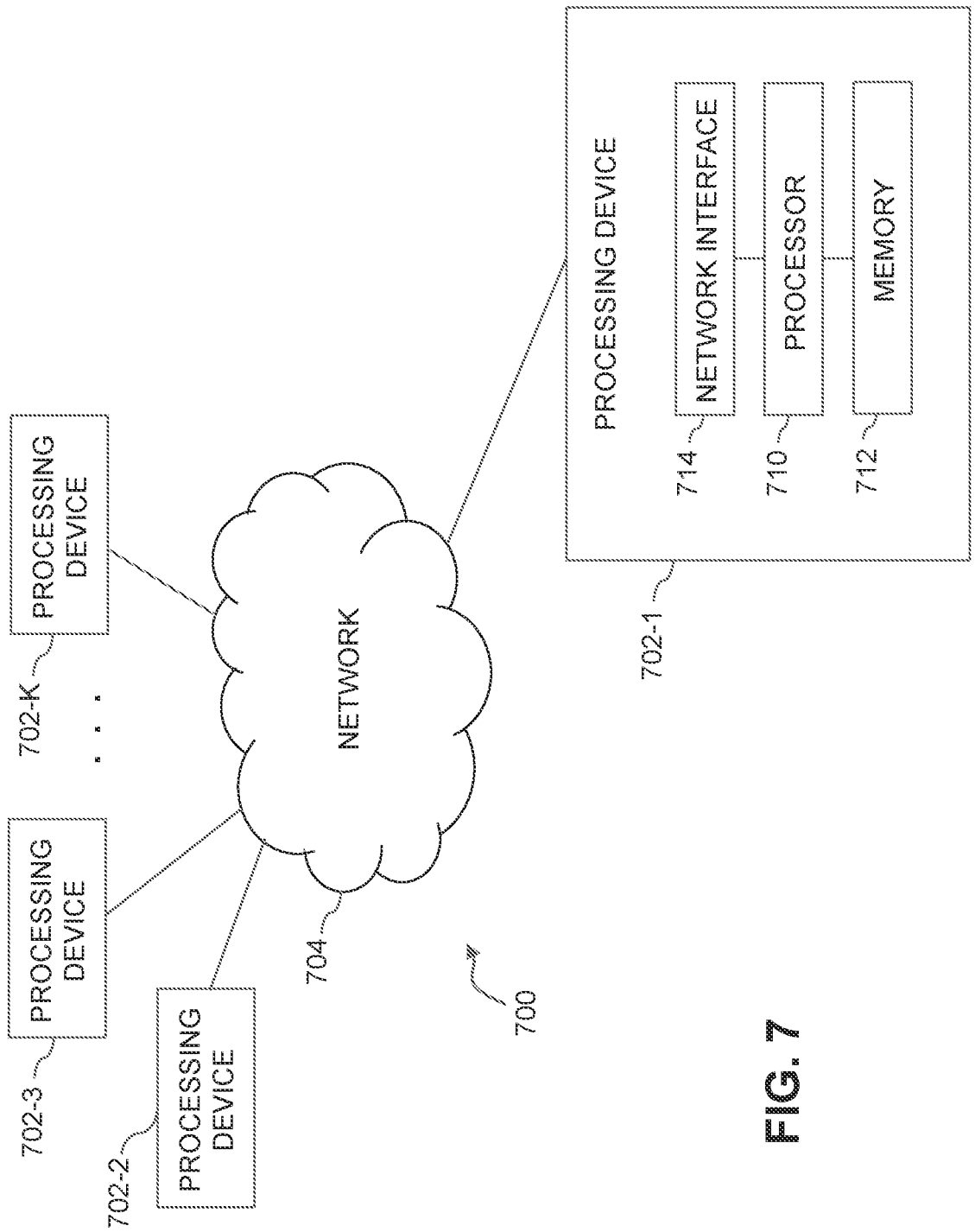
FIG. 7 illustrates another exemplary processing platform that may be used to implement at least a portion of one or more embodiments of the disclosure.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method performed by a first Internet of Things component, comprising:
   obtaining sensor data;
   obtaining, by the first Internet of Things component, a data management policy that specifies one or more of a data transmission policy, a data retention policy, a data retirement policy and a data processing policy for a processing of the sensor data by a plurality of Internet of Things components comprising the first Internet of Things component and one or more additional Internet of Things components;
   providing a plurality of data policy operators as part of the data management policy to apply to the sensor data based on the data management policy, wherein one or more of the data policy operators apply at least one data reduction operation to the sensor data to generate reduced sensor data and provide metadata with the reduced sensor data describing the at least one data reduction operation; and
   processing, by the first Internet of Things component, the sensor data based on the obtained data management policy, wherein the plurality of Internet of Things components that apply the data management policy to the sensor data comprises at least one gateway device that aggregates, according to the data management policy, at least a portion of the sensor data from a plurality of sensor devices and at least one backend storage device that stores data according to the data management policy, wherein the at least one gateway device and the at least one backend storage device are distinct devices with respect to one another and wherein the at least one gateway device provides the aggregated sensor data to the at least one backend storage device.

2. The method of claim 1, wherein the data transmission policy specifies how to manipulate the sensor data before the sensor data is one or more of transmitted and stored by a given Internet of Things component.

3. The method of claim 1, wherein the data retention policy specifies a duration that the sensor data is maintained in storage.

4. The method of claim 1, wherein the data retirement policy specifies a processing of the sensor data when one or more predefined storage criteria are satisfied.

5. The method of claim 1, wherein the data management policy further specifies a predefined handling of the sensor data when communications are disrupted.

6. The method of claim 1, wherein the data processing policy specifies a central processing unit limitation for processing the sensor data.

7. The method of claim 1, wherein the data management policy applies to substantially all of the Internet of Things components of a given Internet of Things system.

8. The method of claim 1, wherein the data policy operators are applied to the sensor data to one or more of (i) adjust a resolution of the sensor data; (ii) aggregate the sensor data; and (iii) apply a learning algorithm to the sensor data, based on the data management policy.

9. The method of claim 1, further comprising the step of applying at least a portion of the data management policy to one or more of the Internet of Things components based on one or more of a device type, a device class, a geographical region, a hierarchical location in an Internet of Things system, and a device identifier.

10. The method of claim 1, further comprising the step of processing a query of the data management policy.

11. A first Internet of Things component, comprising:
   a memory; and
   at least one processing device, coupled to the memory, operative to implement the following steps:
   obtaining sensor data;
   obtaining, by the first Internet of Things component, a data management policy that specifies one or more of a data transmission policy, a data retention policy, a data retirement policy and a data processing policy for a processing of the sensor data by a plurality of Internet of Things components comprising the first Internet of Things component and one or more additional Internet of Things components;
   providing a plurality of data policy operators as part of the data management policy to apply to the sensor data based on the data management policy, wherein one or more of the data policy operators apply at least one data reduction operation to the sensor data to generate reduced sensor data and provide metadata with the reduced sensor data describing the at least one data reduction operation; and processing, by the first Internet of Things component, the sensor data based on the obtained data management policy, wherein the plurality of Internet of Things components that apply the data management policy to the sensor data comprises at least one edge gateway device that aggregates, according to the data management policy, at least a portion of the sensor data from a plurality of sensor devices and at least one backend storage device that stores data according to the data management policy, wherein the at least one gateway device and the at least one backend storage device are distinct devices with respect to one another and wherein the at least one gateway device provides the aggregated sensor data to the at least one backend storage device.

12. The Internet of Things component of claim 11, wherein the data transmission policy specifies how to manipulate the sensor data before the sensor data is one or more of transmitted and stored by a given Internet of Things component.

13. The Internet of Things component of claim 11, wherein the data retention policy specifies a duration that the sensor data is maintained in storage.

14. The Internet of Things component of claim 11, wherein the data retirement policy specifies a processing of the sensor data when one or more predefined storage criteria are satisfied.

15. The Internet of Things component of claim 11, wherein the data management policy further specifies a predefined handling of the sensor data when communications are disrupted.

16. The Internet of Things component of claim 11, wherein the data processing policy specifies a central processing unit limitation for processing the sensor data.

17. The Internet of Things component of claim 11, further comprising the step of applying at least a portion of the data management policy to one or more of the Internet of Things components based on one or more of a device type, a device class, a geographical region, a hierarchical location in an Internet of Things system, and a device identifier.

18. The Internet of Things component of claim 11, wherein the data policy operators are applied to the sensor data to one or more of (i) adjust a resolution of the sensor data; (ii) aggregate the sensor data; and (iii) apply a learning algorithm to the sensor data, based on the data management policy.

19. A computer program product, comprising a non-transitory machine-readable storage medium having encoded therein executable code of one or more software programs, wherein the one or more software programs when executed by at least one processing device perform the following steps:

obtaining sensor data;

obtaining, by a first Internet of Things component, a data management policy that specifies one or more of a data transmission policy, a data retention policy, a data retirement policy and a data processing policy for a processing of the sensor data by a plurality of Internet of Things components comprising the first Internet of Things component and one or more additional Internet of Things components;

providing a plurality of data policy operators as part of the data management policy to apply to the sensor data based on the data management policy, wherein one or more of the data policy operators apply at least one data reduction operation to the sensor data to generate reduced sensor data and provide metadata with the reduced sensor data describing the at least one data reduction operation; and processing, by the first Internet of Things component, the sensor data based on the obtained data management policy, wherein the plurality of Internet of Things components that apply the data management policy to the sensor data comprises at least one gateway device that aggregates, according to the data management policy, at least a portion of the sensor data from a plurality of sensor devices and at least one backend storage device that stores data according to the data management policy, wherein the at least one gateway device and the at least one backend storage device are distinct devices with respect to one another and wherein the at least one gateway device provides the aggregated sensor data to the at least one backend storage device.

20. The computer program product of claim 19, wherein the data policy operators are applied to the sensor data to one or more of (i) adjust a resolution of the sensor data; (ii) aggregate the sensor data; and (iii) apply a learning algorithm to the sensor data, based on the data management policy.

* * * * *

UNITED STATES PATENT AND TRADEMARK OFFICE
CERTIFICATE OF CORRECTION

PATENT NO. : 10,958,536 B2  
APPLICATION NO. : 15/959592  
DATED : March 23, 2021  
INVENTOR(S) : Jehuda Shemer et al.

Page 1 of 1

It is certified that error appears in the above-identified patent and that said Letters Patent is hereby corrected as shown below:

In the Claims

Column 13, Line 9, in Claim 11, replace "at least one edge gateway" with -- at least one gateway --

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*